US007702400B2

(12) United States Patent  (10) Patent No.: US 7,702,400 B2
Marchetti  (45) Date of Patent: Apr. 20, 2010

(54) MOTION CONTROLLERS AND SIMULATION SYSTEMS INCLUDING MOTION CONTROLLERS

(75) Inventor: Jay D. Marchetti, Pittsburgh, PA (US)

(73) Assignee: Ideal Aerosmith, Inc., East Grand Forks, MN (US)

( * ) Notice: Subject to any disclaimer, the term of this patent is extended or adjusted under 35 U.S.C. 154(b) by 141 days.

(21) Appl. No.: 11/804,886

(22) Filed: May 21, 2007

(65) Prior Publication Data

US 2008/0052418 A1    Feb. 28, 2008

Related U.S. Application Data

(60) Provisional application No. 60/802,406, filed on May 22, 2006.

(51) Int. Cl.
   *G06F 15/46* (2006.01)
(52) U.S. Cl. .................. 700/3; 700/10; 700/61; 703/6
(58) Field of Classification Search .............. 700/3, 700/10, 61–63; 703/6
   See application file for complete search history.

(56) References Cited

U.S. PATENT DOCUMENTS

| 5,588,132 | A | * | 12/1996 | Cardoza | 711/148 |
| 5,719,797 | A | * | 2/1998 | Sevachko | 703/4 |
| 5,826,060 | A | * | 10/1998 | Santoline et al. | 703/6 |
| 6,007,338 | A | | 12/1999 | DiNunzio et al. | |
| 6,295,314 | B1 | * | 9/2001 | Cole | 375/222 |
| 7,315,791 | B2 | * | 1/2008 | Ilic et al. | 702/125 |
| 2005/0257194 | A1 | * | 11/2005 | Morrow et al. | 717/109 |
| 2006/0036992 | A1 | * | 2/2006 | Hayles et al. | 717/104 |
| 2006/0037008 | A1 | * | 2/2006 | Stelzer et al. | 717/136 |

FOREIGN PATENT DOCUMENTS

| EP | 0 125 776 | 11/1984 |
| WO | WO 2004/049159 | 6/2004 |
| WO | WO 2007/139733 | 12/2007 |

OTHER PUBLICATIONS

Erkkinen, Tom, Getting the Most Out of Your Hardware-In-the-Loop System, Applied Dynamics International, AD-Lib An ADI Customer Newsletter, vol. 14, No. 2, 1998, pp. 1-12.
Valentino, George J., Shared-Memory Networks: Decription, History, and Candidate as a Future Avionics Architecture, Aerospace and Electronics Conference, May 24, 1993, pp. 165-172.

\* cited by examiner

*Primary Examiner*—Albert DeCady
*Assistant Examiner*—Douglas S Lee
(74) *Attorney, Agent, or Firm*—Bartony & Associates, LLC

(57) ABSTRACT

A motion controller including a computer comprising a primary processor or a central processing unit and an input/output communication bus. The primary processor is in communicative connection with the bus and is adapted to communicate with other devices in communicative connection with the bus via the bus. The motion controller also includes at least one secondary processor in communicative connection with the bus. The secondary processor is adapted to execute at least one control algorithm for one or more axes of motion associated therewith. The secondary processor is further adapted to communicate with other devices in communicative connection with the bus via the bus independently of the primary processor (that is, the secondary processor is can effect bus mastering). The operating system of the computer can, for example, be a general purpose operating system.

16 Claims, 4 Drawing Sheets

Increasing Time →

| Axis1 (DSP1) | Axis2 (DSP2) | Simulation Computer |
|---|---|---|
| • Wait for DmdTrigger value to change. | • Wait for DmdTrigger value to change. | • Write new PVA demands for each axis.<br>• Increment the DmdTrigger.<br>• Wait for all axis ReadTrig values to be equal to present DmdTrigger. |
| • Read new Axis1 PVA demands PD1, VD1, AD1. | • Read new Axis2 PVA demands PD2, VD2, AD2. | |
| • Write present Axis1 PVA readouts PR1, VR1, AR1.<br>• Write present DmdTrigger value to Axis1 ReadTrig RTrig1. | • Write present Axis2 PVA readouts PR2, VR2, AR2.<br>• Write present DmdTrigger value to Axis2 ReadTrig RTrig2. | |
| • Save local copy of present DmdTrigger.<br>• Initiate Axis1 extrapolation trajectory using new PVA demands. | • Save local copy of present DmdTrigger.<br>• Initiate Axis2 extrapolation trajectory using new PVA demands. | • Read readouts for all axes.<br>• Initiate computations for next simulation frame period. |
| Repeat | | |

Fig. 6

MOTION CONTROLLERS AND SIMULATION SYSTEMS INCLUDING MOTION CONTROLLERS

CROSS-REFERENCE TO RELATED APPLICATION

This application claims the benefit of U.S. Provisional Patent Application Ser. No. 60/802,406, filed May 22, 2006, the disclosure of which is incorporated herein by reference.

BACKGROUND OF THE INVENTION

The present invention relates generally to motion controllers and simulation systems including motion controllers.

Motion controllers are components that range from ON/OFF devices with simple linear controllers to complex, user programmable modules that act as controllers within complex integrated multi-axis motion systems. For example, a motion controller can be used in flight simulator systems. Typically, a simulation computer supplies position, velocity, and acceleration (PVA) demands for three (3) or more axes of motion to the controller on a precise periodic schedule, for example, one PVA demand set per axis each millisecond. As such, the simulation computer supplies a piece-wise motion trajectory over time that the motion controller ensures the physical axis follows the supplied motion trajectory.

In addition to sending axis trajectories to the controller, the simulation computer can also read measurements, or readouts, from the motion controller of the actual physical axis PVA. The simulation computer can then use this data to modify its subsequent PVA demand set(s). This control mode represents a form of testing known as hardware-in-the-loop (HWIL) testing, wherein a larger control-loop is formed around the seeker and the flight motion simulator, of which the motion controller is an essential component.

Currently available motion controllers are typically based upon industrially packaged personal computer (PC) hardware. In most such designs the PC processor, hereinafter referred to as the "PC", performs in a supervisory and communications role only, while digital servo loop closure and other axis-specific, hard real-time functions are executed on a daughter or slave card processor optimized for mathematical operations. The daughter or slave card is often a digital signal processor (DSP).

The daughter card(s), hereinafter referred to as the "DSP card(s)", execute the control algorithms for one or more axes and normally exist as slaves on a communication bus mastered by the PC. In most cases this bus is an industry-standard parallel input/output (I/O) bus such as ISA bus or a Peripheral Component Interconnect (PCI) bus.

As illustrated in FIG. 1, in a number of currently available HWIL control systems 10, PC 30 supervises the start-up, shut-down, and run-time operations of motion controller 20 while also generally maintaining the demand and readout PVA data transactions for all simulator axes by moving data between one or more DSP cards 40 and a reflective memory interface (RMI) 50. Typically, RMI 50 of motion controller 20 is, like DSP card(s) 40, yet another slave card on I/O bus 60 of PC 30. RMI card 50 of motion controller 20 is in communicative connection with a corresponding RMI card 70 residing within a simulation computer 80 via, for example, an ultra high-speed communications link such as a fiber optic link 90. This arrangement yields extremely low data communication latencies between reflected (that is, identical content maintained) memory on RMI card 50 and RMI card 70. This low latency is important in minimizing the phase margin of, and thereby enhancing the stability of, HWIL control system 10.

In its function as the I/O bus master of motion controller 20, PC 30 must: (i) Quickly recognize, whether by polling or via an interrupt from the RMI card 50, that a new block of multi-axis demand PVA data is available in the memory of simulator RMI card 70; (ii) Read (whether by programmed I/O into PC memory or via direct memory access (DMA)) the block of demand PVA data and then write (distribute) the demand PVA data to the appropriate DSP card(s) 40; (iii) Read (whether by programmed I/O into PC memory or via direct memory access (DMA)) the readout PVA data from DSP card(s) 40 and then write the resulting block of multi-axis readout PVA data to the memory of RMI card 50; and (iv) Set a flag variable in the memory of RMI card 50 to signal simulation computer 60 that the demand block/readout block transaction is complete.

The above-described motion controller architecture and HWIL operational scenario, which is the basis of, for example, a number of existing commercial and historical flight simulation controllers, is predicated on the ability of PC 30 to respond with very low latency to the arrival of the demand PVA data block and then rapidly move demand and readout data among multiple DSP cards 40 and simulator RMI card 70.

The requirement of bounded (guaranteed) timeliness on PC 30 forces the modern motion controller designer to utilize a real time operating system (RTOS) executing on PC 30. A number of such RTOS's are commercially available. A real-time operating system or RTOS schedules tasks to be performed according to a set of established priorities. Such tasks typically follow a predictable schedule of execution. The ability to respond to environmental inputs in a priority-based manner allows a real-time operating system to respond almost instantaneously to events as they occur and, in general, an RTOS is capable of guaranteeing a certain capability within a specified time constraint Unfortunately, most RTOS's are substantially more expensive and more difficult to operate than a general purpose operating system (GPOS) such as Microsoft Windows®. Moreover, RTOS's generally lack the features that computer-savvy users have come to expect when using a motion controller's local display, for example, a GPOS graphical user interface (GUI) and file system (as, for example, provided with Microsoft Windows®). The RTOS thus adds both recurring and non-recurring design costs to motion controller 20 and further disadvantages the design either by forcing compromises in the controller's local user interface, or by adding the additional cost to provide a second dedicated local interface PC 100 that communicates with controller PC 30.

It thus remains desirable develop improved motion controllers and simulation systems that reduce or eliminate the above and other problems with currently available motion controllers and simulation systems.

SUMMARY OF THE INVENTION

In one aspect, the present invention provides a motion controller including a computer comprising a primary processor or a central processing unit and an input/output communication bus. The primary processor is in communicative connection with the bus and is adapted to communicate with at least one other device (or with other devices) in communicative connection with the bus via the bus. The motion controller also includes at least one secondary processor in communicative connection with the bus. The secondary processor is adapted to execute at least one control algorithm for one or more axes of motion associated therewith. The secondary processor is further adapted to communicate with at least one other device (or with other devices) in communicative connection with the bus via the bus independently of the primary processor (that is, the secondary processor can effect bus mastering). The operating system of the computer can, for example, be a general purpose operating system (and not a real time operating system as described above).

The input output communication bus can, for example, be a PCI bus. One skilled in the art appreciates, however, that many other types of buses can be used.

The motion controller can further include at least one reflective memory interface in communicative connection with the bus. The reflective memory interface is adapted to communicate data with another reflective memory interface of a simulation computer. The reflective memory interface of the motion controller can, for example, be in communication with the reflective memory interface of the simulation computer via a high speed data link such as a fiber optic communication link.

In several embodiments, the secondary processor is operable to poll the reflective memory interface of the motion controller via the bus to determine whether new data has been received by the reflective memory interface of the motion controller from the reflective memory interface of the simulation computer, read any new data via the bus, store any new data in a local memory in communicative connection with the secondary processor, and write output data determined from any new data to the reflective memory interface of the motion controller via the bus. The secondary processor can further be operable to set a flag variable in memory of the reflective memory interface of the motion controller to provide an indication that the secondary processor has completed a data input/data output transaction for the one or more axes of motion associated therewith.

The secondary process can, for example, be a component of a digital signal processing card. In several embodiments, the digital signal processing card is operable as a slave card and a bus mastering card, wherein the digital signal processing card periodically requests temporary mastering of the bus from the primary processor.

In several embodiments, once the digital signal processing card is granted bus mastership, the secondary processor polls the reflective memory interface of the motion controller via the bus to determine whether new data has been received by the reflective memory interface of the motion controller from the reflective memory interface of the simulation computer, reads any new data via the bus, stores any new data in a local memory in communicative connection with the secondary processor, and writes output data determined from any new data to the reflective memory interface of the motion controller via the bus. The secondary processor of the digital signal processing card can relinquish bus mastership to the primary processor upon completion of a data transaction with the reflective memory interface of the motion controller.

Data read from the reflective memory interface of the motion controller by the secondary processor can, for example, include position, velocity and acceleration data for the one or more axes of motion associated with the secondary processor. Data written to memory of the reflective memory interface of the motion controller by the secondary processor can, for example, include position, velocity and acceleration data for the one or more axes of motion associated with the secondary processor.

In another aspect, the present invention provides a simulation system including a motion controller including a motion controller computer having a primary processor and an input/output communication bus. The primary processor is in communicative connection with the bus and is adapted to communicate with at least one other device (or with other devices) in communicative connection with the bus via the bus. The motion controller further includes at least one secondary processor in communicative connection with the bus. The secondary processor is adapted to execute at least one control algorithm for one or more axes of motion associated therewith. The secondary processor is further adapted to communicate with at least one other device (or with other devices) in communicative connection with the bus via the bus independently of the primary processor. The motion controller also includes at least one reflective memory interface in communicative connection with the bus. The simulation system further includes a simulation computer including a processor and a reflective memory interface and a communication line between the reflective memory interface of the motion controller and the reflective memory interface of the simulation computer.

In a further aspect, the present invention provides a method of effecting motion control including: providing a computer including a primary processor and an input/output communication bus, the primary processor being in communicative connection with the bus and being adapted to communicate with at least one other device (or with other devices) in communicative connection with the bus via the bus; providing at least one secondary processor in communicative connection with the bus, the secondary processor being adapted to execute a control algorithms for one or more axes of motion associated therewith; and having the secondary processor communicate with at least one other device (or with other devices) in communicative connection with the bus via the bus independently of the primary processor.

In still a further aspect, the present invention provides an expansion or processing card for use with a computer. The computer includes a central processing unit and a computer input/output communication bus in communicative connection with the central processing unit. The expansion card includes a connector to place the card in communicative connection with the computer communication bus, a local input/output communication bus in communicative connection with the connector, at least one secondary processor in communicative connection with the local communication bus, a memory in communicative connection with the local communication bus, and at least one communication port in communicative connection with the local communication bus and being adapted to be placed in communicative connection with at least one component associated with at least one axis of motion to be controlled. The secondary processor is adapted to execute at least one control algorithm for the at least one axis of motion and to communicate with at least one other device (or with other devices) in communicative connection with the computer communication bus via the bus independently of the central processing unit.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 6 illustrates a representative processing sequence for digital signal processing cards

DETAILED DESCRIPTION OF THE INVENTION

Figure 1:
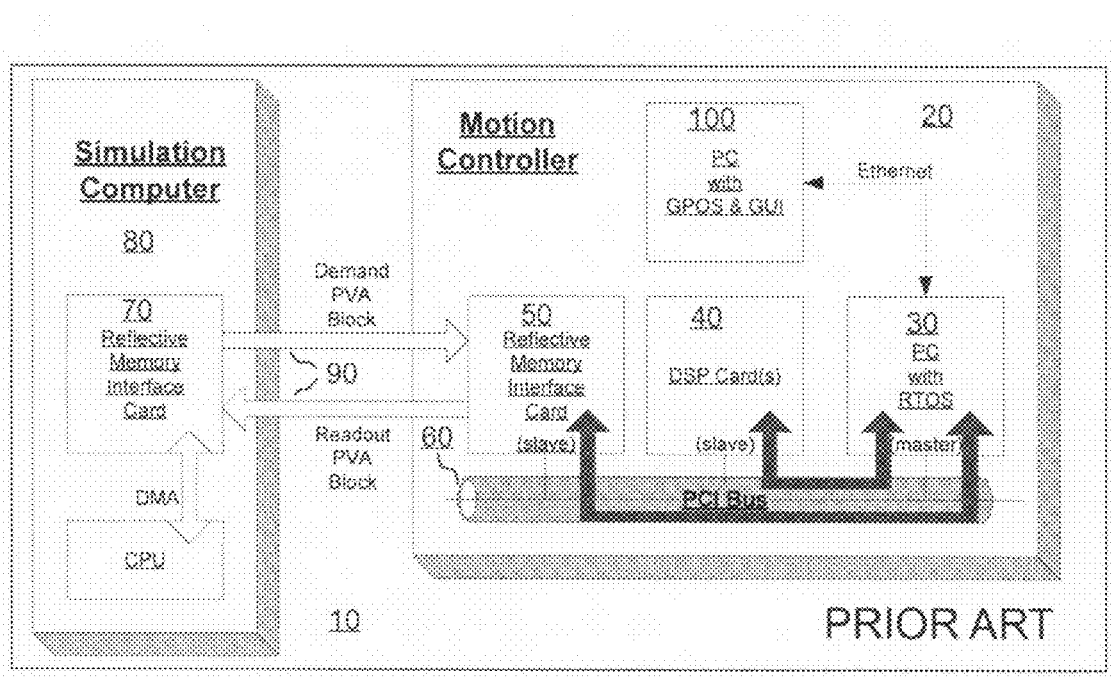
FIG. 1 illustrates a schematic representation of a currently available hardware in the loop motion controller.
Figure 2:
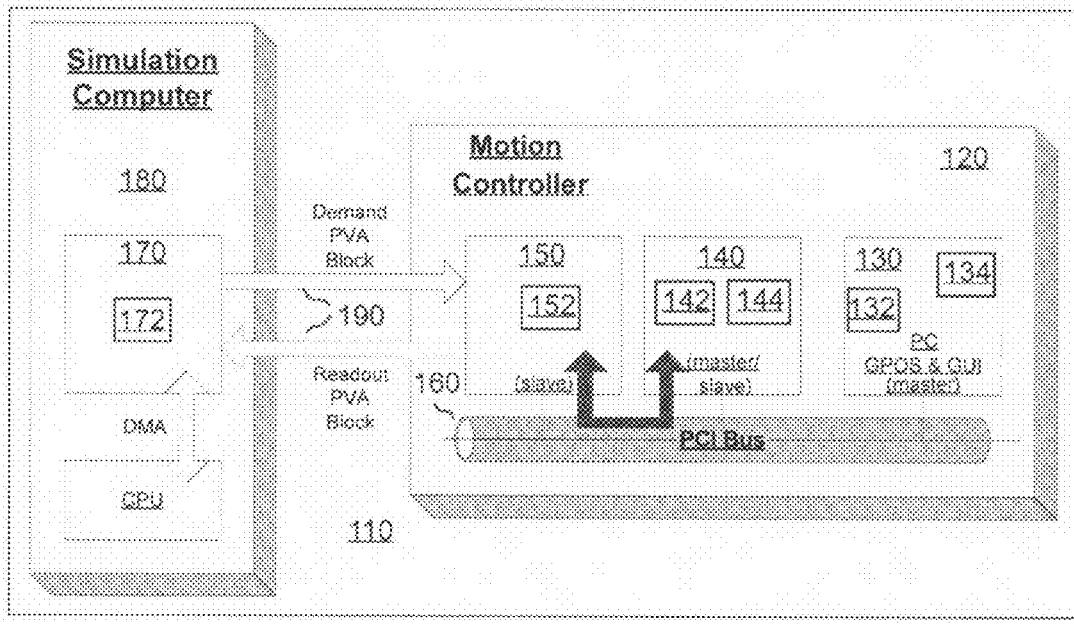
FIG. 2 illustrates an embodiment of a motion controller and simulation system of the present invention.

In one embodiment of the present invention, as illustrated, for example, in FIG. 2, a motion controller 120 (forming part of an HWIL control system 110) of the present invention includes commercially available PC hardware (for example, a PC 130 including, for example, a processor 132, such as available from Intel of Santa Clara, Calif., and a memory 134). Motion controller 120 provides a substantial improvement over traditional HWIL motion controller (for example, as illustrated in FIG. 1) by utilizing a feature of an I/O bus such as a PCI or other data/communication bus 160 referred to as bus mastering. In bus mastering, processor 132 of PC 130 is not the sole master of I/O bus 160 of PC 130. In general, bus mastering refers to the capability of devices on PCI bus 160 (other than the PC system chipset or processor 132) to take control of bus 160 and perform transfers directly. In that regard, DSP card(s) 140 of the present invention, which include DSP memory 142 and DSP controller 144, are designed or adapted to periodically request temporary mastership of PCI bus 160 from PC 130. When granted mastership, each DSP card 140: (i) Polls (via PCI bus 160) for an indication that a new block of multi-axis demand PVA data is available in memory 172 of RMI card 170 of simulator computer 180 (Since DSP card 140 is generally optimized for speed and utilizes no operating system, the latency of detecting new data blocks, and acting once a new data block is detected, is less than the case in which a PC (such as PC 30 in system 10) acts as an intermediary.); (ii) Reads (via PCI bus I/O code programmed on DSP card 140) the demand PVA data intended for its axes of control and stores the data in local DSP memory 142; (iii) Writes (via PCI bus I/O code programmed on DSP card 140) the readout PVA data for its axes of control to memory 152 of RMI card 150 and (iv) Sets a flag variable in the memory 152 of RMI card 150 to signal that the particular DSP card 140 has completed its demand block/readout block transaction for its axes of control. Simulation computer 180 waits until this flag is asserted by all DSP cards 140 (for example, for all axes of control) in motion controller 120.

Once its demand block/readout block transaction is complete, each DSP card 140 relinquishes PCI bus 160 mastership back to PC 130 and becomes a slave again. At this point, PC 130 may then read and write to DSP card(s) 140 as slaves, for example, to maintain a local GUI, or to any other PCI slave devices residing on PCI bus 160, as normal.

By pushing the hard real-time requirement for RMI data I/O down to DSP card(s) 140 where the data is actually utilized or produced. PC 130 is relieved of the need for tightly bounded timeliness, even in HWIL applications. This approach of the present invention permits PC 130 to execute a GPOS, such as MICROSOFT WINDOWS®, that is more suited for its remaining purposes (including, but not limited to, supervisory functions, providing a local GUI, and providing soft real-time communications interfaces such as Ethernet, IEEE-488, or RS-232). As compared to currently available motion controller systems (for example, incorporating RTOSs), motion controller 120 reduces both cost and complexity while also providing the benefits of a true MICROSOFT WINDOWS (or other GPOS) local user interface and lowered latency HWIL data I/O.

Figure 3:
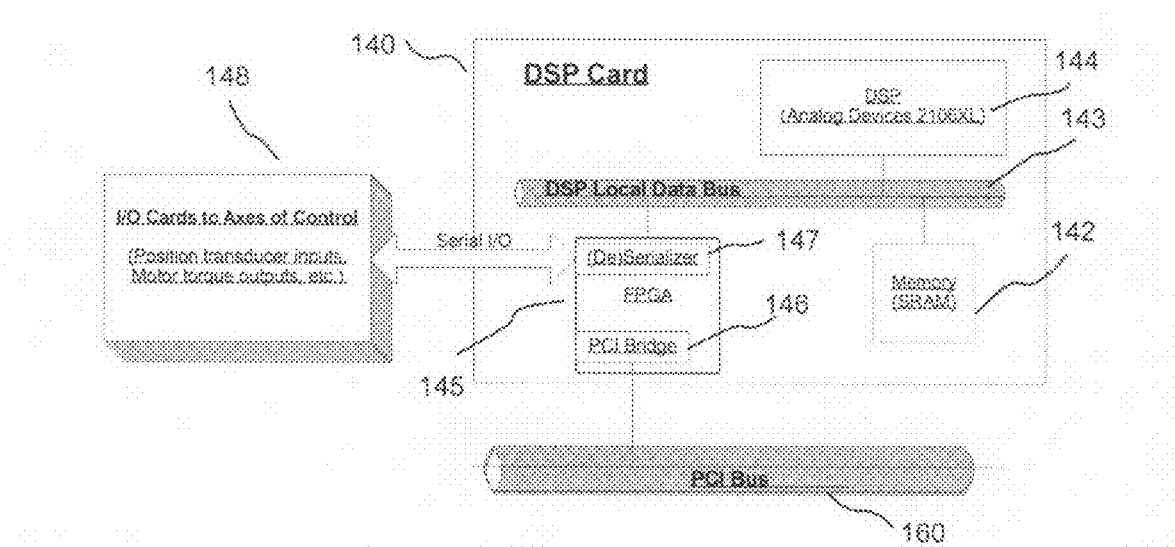
FIG. 3 illustrates an embodiment of a digital signal processor card for use in the present invention.

FIG. 3 illustrates an embodiment of a DSP card 140 suitable for use in the present invention. As described above, DSP card 140 includes a controller or digital signal processor 144 (for example, DSP 2106XP available for Analog Devices, Inc.) and a memory (for example, SRAM) in communication with DSP controller 144 via DSP local data/communications bus 143. A field programmable gate array (FPGA) 145 (for example, available from Altera) is also in communicative connection with DSP local data/communication bus 143 and provides (via, a serializer/deserializer 147) for input/output communication with input/output cards 148 in communicative connection with the axes of control (position transducers, inputs, motor torque outputs etc.). FPGA 145 also includes a communication or connector bridge 146 (for example, a PCI connector bridge as known in the art) for communication with communication/data bus 160.

In several embodiments of the present invention, several pins on DSP PCI bus connector 146 were reserved for bus mastering. In general, on PCI bus 160, any device having bus mastering capability can take control of the bus at any time, even allowing it to shut out motherboard CPU 134. PCI bus master devices use bandwidth as available and can potentially use all bandwidth in the system if no other devices are requesting it. Bus mastering is initiated by a bus mastering device such as DSP card 140 sending a request signal when it requires control of communication/data bus 160 to a central resource (not shown), which is embodied as circuitry on the motherboard of PC 130 shared by all bus devices. Bus control is relinquished to the device when a grant signal is received. PCI bus mastering is specified, for example, in technical detail in the PCI Local Bus Specification, Revision 2.3, available from PCI Special Interest Group (SIG) of Hillsboro, Oreg. (www.psisig.com), the disclosure of which is incorporated herein by reference.

Figure 4:
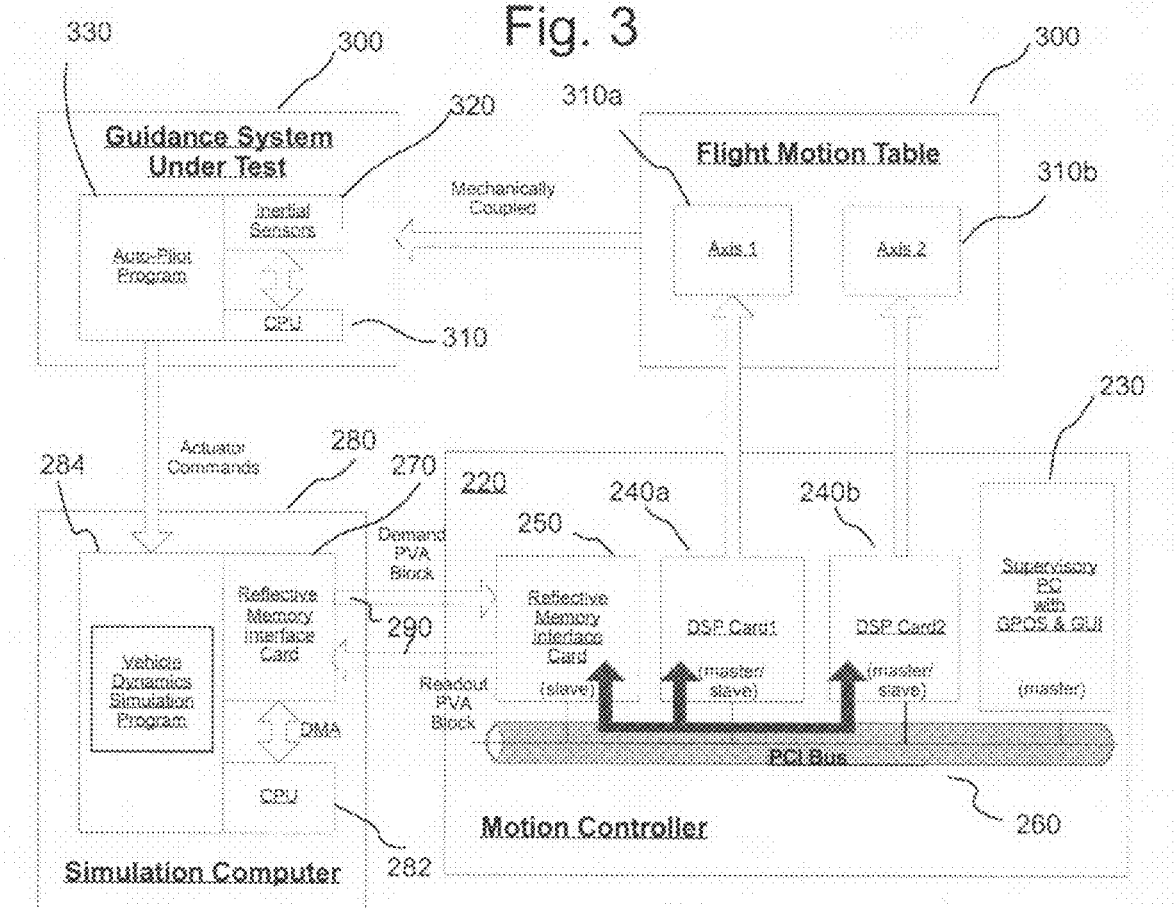
FIG. 4 illustrates another embodiment of a motion controller and simulation system of the present invention wherein multiple digital signal processors are illustrated in communicative connection with an I/O bus of a PC and with a flight motion table.

FIG. 4 illustrates another embodiment of a hardware-in-the-loop simulation system 210 and motion controller 220 of the present invention that operates essentially in the manner described above for simulation system 110 and motion controller 120. Components of simulation system 210 are numbered similarly to corresponding components of simulation system 110 with 100 added to each designation numeral. Motion controller 220 includes two DSP cards 240a and 240b, each of which can control one or more axes of control of a controlled element 300 (for example, a flight motion table or rate table simulating the motion of a missile, an aircraft, a launch vehicle, an unmanned aerial vehicle, an automobile etc.). In the illustrated embodiment, flight motion table 300 includes two axes of control 310a and 310b in operative connection with bus mastering DSP cards 240a and 240b, respectively (as described above in connection with FIGS. 2 and 3). Suitable flight motion tables for use in the present invention are, for example, available from Ideal Aerosmith, Inc. of East Grand Forms, Minn.

Flight motion table 300 is mechanically coupled to a guidance system 400 under test. As illustrated in FIG. 4, guidance system 300 includes a processor or controller 310 in operative connection with inertial sensors 320. Processor 310 is, for example, operable to execute an auto-pilot program 330, as known in the art. Guidance system 300 transmits actuator commands to simulation computer 280 including a processor or controller 282, which executes a vehicle dynamics simulation program stored in a memory 284 thereof.

As described above in connection with system 110, simulation computer 280 includes a reflective memory interface card 270 in communicative connection (via, for example, a high-speed communication portal or link 290 (such a fiber optic communication link) with reflective memory interface card 250 of motion controller 220.

Figure 5:
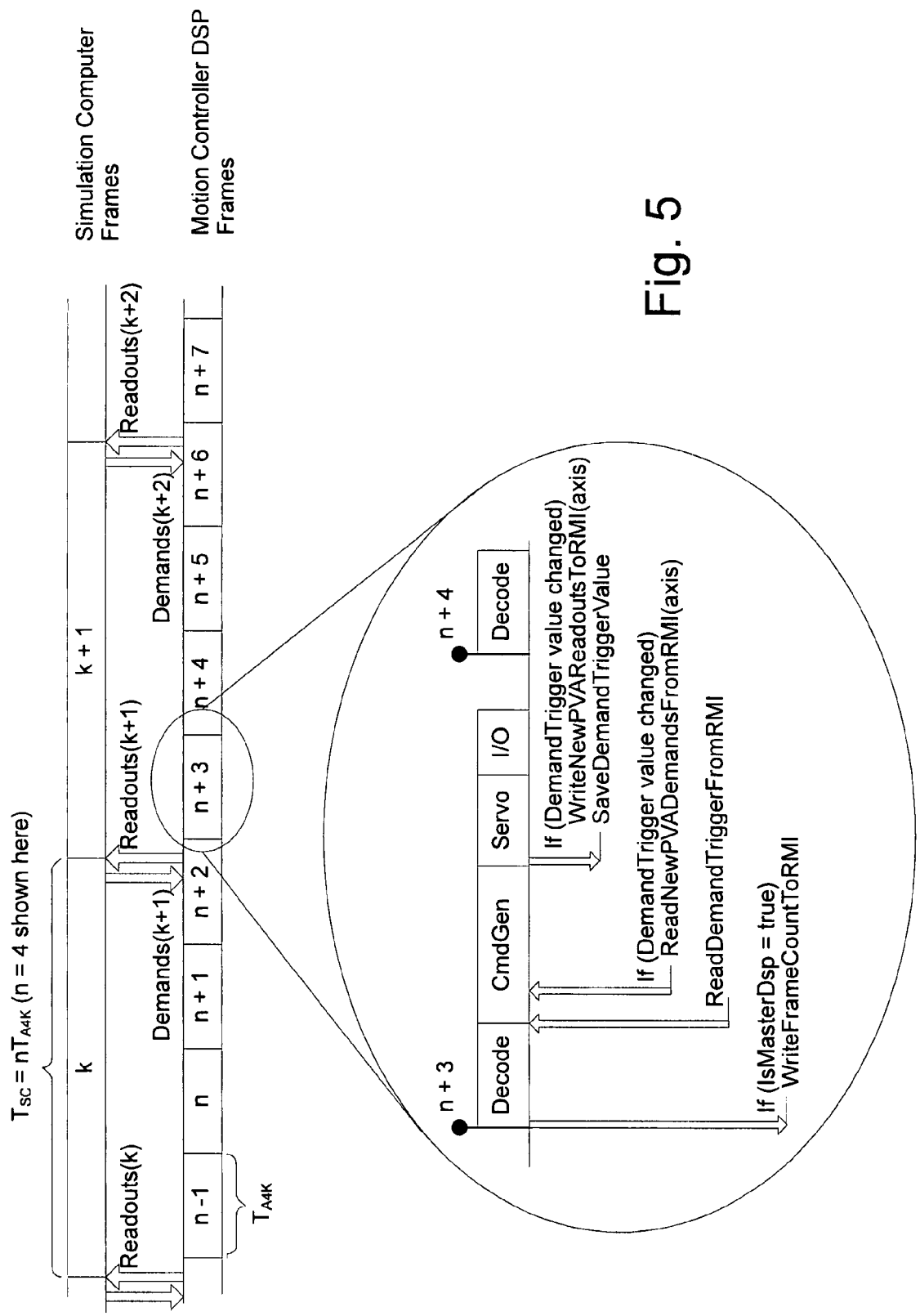
FIG. 5 illustrates an embodiment of a sequencing relationship between a simulation computer and the digital signal processing cards of a motion controller such as illustrated in FIG. 4 of the present invention.

DSP cards 240a and 240b are in communicative connection with communication bus 160 as described above in connection with FIGS. 2 and 3. An embodiment of a sequencing relationship between simulation computer 280 and one of DSP cards 240a and 240b of motion controller 220 is illustrated in FIG. 5.

PVA Demands and PVA readouts for shared reflective memory regions for the dual-axis system of FIG. 4 are summarized in Tables 1 and 2 below.

TABLE 1

PVA Demands (7, 32-bit Data WORDS)

|  | PosDmd | VelDmd | AccDmd |
|---|---|---|---|
| Axis 1 | PD1 | VD1 | AD1 |
| Axis 2 | PD2 | VD2 | AD2 |
| DmdTrigger | DTrig | | |

TABLE 2

PVA Readouts (9, 32-bit Data WORDS)

|  | PosRead | VelRead | AccRead | ReadTrig |
|---|---|---|---|---|
| Axis 1 | PR1 | VR1 | AR1 | RTrig1 |
| Axis 2 | PR2 | VR2 | AR2 | RTrig2 |
| FrameCount | FCnt | | | |

A representative processing sequence for DSP cards 240a and 240b is set forth in FIG. 6. In several embodiment of the present invention, all DSP cards in the motion controller (including, for example, DSP cards 240a and 240b of motion controller 220) ran from the same high-accuracy time reference (for example, a 5000 Hz time reference) and were, therefore, synchronized. Simulation computer 280 has its own high-accuracy time reference or uses the timing reference output of motion controller 220. The simulation period of simulation computer 280 can, for example, be an integer multiple of the simulation period of motion controller 220 (in several embodiments, a 200 microsecond period). Each of DSP card 240a and 240b is capable of independently arbitrating for, mastering, and then relinquishing control of the communication/data bus 260 under DSP program control.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A motion controller comprising:
a computer comprising a primary processor and an input/output communication bus, the primary processor being in communicative connection with the bus; at least one secondary processor in communicative connection with the bus, the secondary processor utilizing no operating system, the secondary processor being adapted to execute at least one control algorithm for one or more axes of motion associated therewith, the secondary processor further being adapted to communicate with at least one device in communicative connection with the bus via the bus independently of the primary processor.

2. The motion controller of claim 1 wherein the operating system of the computer is a not a real-time operating system.

3. The motion controller of claim 2 further comprising at least one reflective memory interface in communicative connection with the bus, the reflective memory interface being adapted to communicate data with another reflective memory interface of a simulation computer.

4. The motion controller of claim 3 wherein the reflective memory interface of the motion controller is in communication with the reflective memory interface of the simulation computer via a fiber optic communication link.

5. The motion controller of claim 3 wherein the secondary processor is operable to poll the reflective memory interface of the motion controller via the bus to determine whether new data has been received by the reflective memory interface of the motion controller from the reflective memory interface of the simulation computer, read any new data via the bus, store any new data in a local memory in communicative connection with the secondary processor, and write output data determined from any new data to the reflective memory interface of the motion controller via the bus.

6. The motion controller of claim 5 wherein the secondary processor is further operable to set a flag variable in memory of the reflective memory interface of the motion controller to provide an indication that the secondary processor has completed a data input/data output transaction for the one or more axes of motion associated therewith.

7. The motion controller of claim 6 wherein the secondary processor is a component of a digital signal processing card.

8. The motion controller of claim 7 wherein the bus is a PCI bus.

9. The motion controller of claim 7 wherein the digital signal processing card is operable as a slave card and a bus mastering card, wherein the digital signal processing card periodically requests temporary mastering of the bus from the primary processor.

10. The motion controller of claim 9 wherein when the digital signal processing card is granted bus mastership, the secondary processor polls the reflective memory interface of the motion controller via the bus to determine whether new data has been received by the reflective memory interface of the motion controller from the reflective memory interface of the simulation computer, reads any new data via the bus, stores any new data in a local memory in communicative connection with the secondary processor, and writes output data determined from any new data to the reflective memory interface of the motion controller via the bus.

11. The motion controller of claim 10 wherein the secondary processor of the digital signal processing card relinquishes bus mastership to the primary processor upon completion of a data transaction with the reflective memory interface of the motion controller.

12. The motion controller of claim 5 wherein data read from the reflective memory interface of the motion controller by the secondary processor comprises position, velocity and acceleration data for the one or more axes of motion associated with the secondary processor.

13. The motion controller of claim 12 wherein data written to memory of the reflective memory interface of the motion controller by the secondary processor comprises position, velocity and acceleration data for the one or more axes of motion associated with the secondary processor.

14. A simulation system comprising:
a motion controller comprising
    a motion controller computer comprising a primary processor and an input/output communication bus, the primary processor being in communicative connection with the bus; and
    at least one secondary processor in communicative connection with the bus, the secondary processor utilizing no operating system, the secondary processor being adapted to execute at least one control algorithms for one or more axes of motion associated therewith, the secondary processor further being adapted to communicate with at least one device in communicative connection with the bus via the bus independently of the primary processor; and
    at least one reflective memory interface in communicative connection with the bus;
a simulation computer comprising a processor and a reflective memory interface; and
a communication line between the reflective memory interface of the motion controller and the reflective memory interface of the simulation computer.

15. A method of effecting motion control comprising:
providing a computer comprising a primary processor and an input/output communication bus, the primary processor being in communicative connection with the bus;
providing at least one secondary processor in communicative connection with the bus, the secondary processor utilizing no operating system, the secondary processor being adapted to execute a control algorithms for one or more axes of motion associated therewith; and
having the secondary processor communicate with at least one device in communicative connection with the bus via the bus independently of the primary processor.

16. An expansion card for use with a computer operating an operating system that is not a real time operating system, the computer comprising a central processing unit and a computer communication bus in communicative connection with the central processing unit, the expansion card including a connector to place the card in communicative connection with the computer communication bus, a local communication bus in communicative connection with the connector, at least one secondary processor in communicative connection with the local communication bus, a memory in communicative connection with the local communication bus, and at least one communication port in communicative connection with the local communication bus and being adapted to be placed in communicative connection with at least one component associated with at least one axis of motion to be controlled, the secondary processor utilizing no operating system and being adapted to execute at least one control algorithm for the at least one axis of motion, the secondary processor further being adapted to communicate with other devices in communicative connection with the computer communication bus via the bus independently of the central processing unit.

* * * * *